(12) United States Patent
Bürger et al.

(10) Patent No.: US 6,607,211 B2
(45) Date of Patent: *Aug. 19, 2003

(54) SAFETY MODULE HAVING A TRIGGER SENSOR

(75) Inventors: Hartmut Bürger, Braunschweig (DE); Günter Bernhardt, Velpke (DE); Hans Fehrmann, Wolfsburg (DE); Manfred Gottwald, Wolfsburg (DE)

(73) Assignee: Volkswagen AG, Wolfsburg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/407,104

(22) Filed: Sep. 27, 1999

(65) Prior Publication Data

US 2002/0158452 A1 Oct. 31, 2002

(30) Foreign Application Priority Data

Sep. 30, 1998 (DE) .......................................... 198 45 013

(51) Int. Cl.7 ............................................. B60R 21/32
(52) U.S. Cl. ..................... 280/735; 180/274; 180/282; 280/734
(58) Field of Search ................................ 280/734, 735; 180/282, 274

(56) References Cited

U.S. PATENT DOCUMENTS 3,859,482 A * 1/1975 Matsui et al. ................ 280/735
5,463,260 A * 10/1995 Ono ............................. 180/282

FOREIGN PATENT DOCUMENTS

| DE | 35 05 330 | | 11/1985 |
| DE | 4001704 A1 | * | 1/1991 |
| DE | 40 01 704 | | 1/1991 |
| DE | 94 06 812.7 | | 7/1994 |
| DE | 44 19 911 | | 12/1995 |
| DE | 19528387 A1 | * | 2/1997 |
| DE | 19531491 A1 | * | 2/1997 |
| DE | 195 31 491 | | 8/1997 |
| DE | 195 28 387 | | 4/1998 |
| EP | 566758 | * | 10/1993 ................ 280/734 |

* cited by examiner

Primary Examiner—Eric Culbreth
(74) Attorney, Agent, or Firm—Kenyon & Kenyon

(57) ABSTRACT

The invention provides a safety module, which includes a trigger sensor for activating a safety system in the event of an accident operated cooperative engagement with a protective device to prevent improper triggering which comprises a damper mass (7) in or on a housing (1) enclosing the trigger sensor (10) and if the safety module is configured as a belt tensioner, the housing (1) may further include a winding device (4) that is pyrotechnically activated by the trigger sensor (10) in the event of an accident.

23 Claims, 1 Drawing Sheet

SAFETY MODULE HAVING A TRIGGER SENSOR

FIELD OF THE INVENTION

This invention relates to a safety module which includes a triggering sensor in cooperative engagement with a damper mass that prevents improper triggering.

BACKGROUND OF THE INVENTION

In order to be able to trigger a safety system, for example, a belt tensioner or an airbag, in the event of an accident, trigger sensors that contain spring-loaded inertial masses are used in the corresponding safety modules. To ensure that the trigger sensor contained in a safety module does not cause improper triggering when a door is slammed or in response to a very uneven road surface, vibration-damping spring elements can be provided between the trigger sensor and the housing of the safety module. One such arrangement is known from DE 44 19 911 A1.

DE Utility Model 94 06 812 describes the arrangement of a delay sensor for triggering or activating an airbag or a belt tensioner in which a vibration-damping impact panel is arranged below the installation region of the delay sensor in order to prevent improper triggering.

A further delay sensor having a sensing element which works against a spring, and whose movement is additionally damped by a slowly dissipating air cushion, is described in DE 35 05 330 A1.

OBJECTS AND SUMMARY OF THE INVENTION

It is the object of this invention to provide a safety module for vehicles having a triggering sensor in which very simple means are used to ensure that vibrations and shocks occurring during normal vehicle operation do not cause improper triggering.

The present invention provides a safety module for vehicles which comprises a trigger sensor for activating a safety system, such as a belt tensioning device or an airbag, and further includes a damper mass for absorbing vibrations that could cause improper actuation of the safety system, wherein the damper mass is directly mounted on the safety module. The damper mass can be mounted inside the module, e.g., on the bracket that holds the trigger sensor in place or on an external surface of the module, e.g., as shown in FIG. 1.

According to the present invention, as a particularly simple and very effective measure for dampening the shocks occurring in normal vehicle operation, a damper mass is affixed to the safety module that is on a component that carries the triggering sensor. For example, the damper mass can be mounted on the same base as the trigger sensor itself, or preferably externally on the housing of the safety module that carries the trigger sensor. External mounting on the housing of the safety module has the advantage that practically no design changes need to be made to the safety module, so that all the devices accommodated in the housing of the safety module can remain unchanged. In order to achieve the desired damping to prevent improper triggering, it is therefore sufficient to mount a metal plate damper mass, or a damper mass of another shape, externally on the housing of the safety module as shown in FIG. 1.

The safety module can be, for example, a belt tensioner or an airbag module. A safety module of this kind comprises a shock sensor in combination with the devices necessary for activation of the particular safety system. These are principally pyrotechnic devices with which, for example, a belt tensioner can be activated in the event of an accident identified by the trigger sensor.

It is particularly advantageous additionally to equip the safety module with at least one spring element for damping vibrations that occur during normal operation of a motor vehicle. This can be a resilient attachment bracket with which the safety module is attached to the vehicle. It is specifically the combination of a spring element together with a damper mass mounted externally on the housing that allows very good tuning of the system to the respective vehicle in order to prevent improper triggering.

A safety module configured as a belt tensioner can be mounted, with the damper mass provided in accordance with the present invention, on a column of a vehicle that adjoins a sliding side door. This ensures that, in particular, even the severe shocks occurring when a sliding side door is slammed do not result in any improper triggering of the belt tensioner.

BRIEF DESCRIPTION OF THE DRAWINGS

The invention is explained in more detail below with reference to an exemplary embodiment depicted in the drawings, in which.

DETAILED DESCRIPTION OF THE INVENTION

Figure 2:
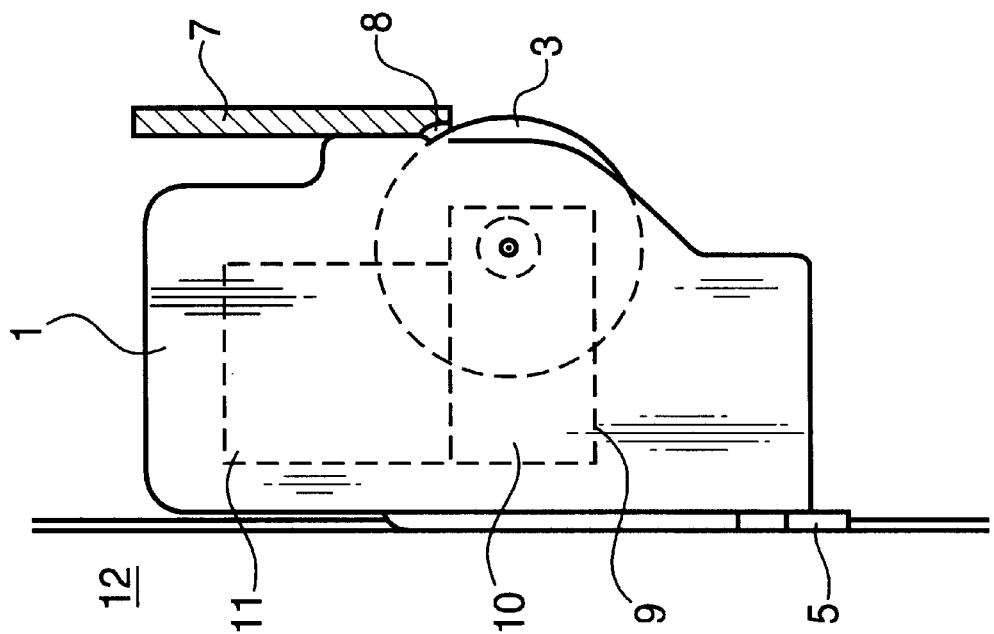
FIG. 2 shows a side view of the safety module shown in FIG. 1.
Figure 1:
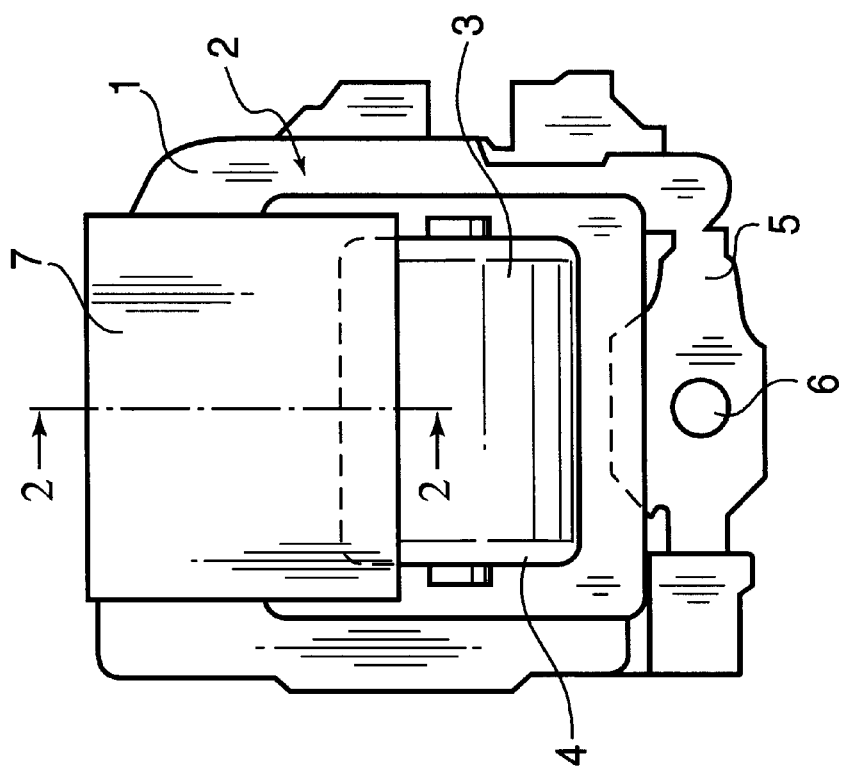
FIG. 1 shows a top plan view of a safety module that is configured as a belt tensioner with internal elements shown in phantom.

The safety module shown in FIG. 1 contains in its housing 1 a belt tensioner 2 whose belt reel 3 is in cooperative engagement with a winding device 4. Located on the back side of the safety module is a resilient attachment bracket 5 having an attachment hole 6 to allow the safety module to be attached, by way of an attachment screw (not shown), for example to the B-pillar of a motor vehicle or a column of a motor vehicle body that adjoins a sliding side door. FIG. 2 schematically illustrates the B-pillar 12 of the motor vehicle or the column 12 of the motor vehicle body that adjoins the sliding side door.

A damper mass 7, in the form of a metal plate that partially covers belt reel 3, is attached externally to housing 1.

FIG. 2 shows the damper mass 7, configured as a metal plate, in section along section line 2—2 of FIG. 1. In the lower region, the metal plate has a cutout 8 into which belt reel 3 projects.

Dashed (phantom) lines 9 are used to indicate winding device 4, arranged in housing 1, that is activated in the event of an accident by a trigger sensor 10 and a pyrotechnic device (not shown in further detail) that, like trigger sensor 10, is well known in the art.

We claim:

1. A safety module for vehicles, which includes a trigger sensor for activating a safety system in the event of an accident and a protective device to prevent improper triggering, wherein the protective device comprises a metal plate damper mass mounted directly on the safety module, the metal plate damper mass configured to damp a shock to prevent improper triggering.

2. The safety module as defined in claim 1, wherein the safety module further includes a housing that encloses the trigger sensor and the metal plate damper mass is affixed to the housing.

3. The safety module as defined in claims 1 or 2, wherein the safety module is a belt tensioner device.

4. The safety module as defined in claim 3, wherein the belt tensioner device is attached to a column of a motor vehicle body that adjoins a sliding side door.

5. The safety module as defined in claim 3, further including a pyrotechnic device for activating the safety module.

6. The safety module as defined in claim 1 or 2, wherein the safety module is an airbag module.

7. The safety module as defined in claim 6, further including a pyrotechnic device for activating the safety module.

8. The safety module as defined in claim 1 or 2, further including a pyrotechnic device for activating the safety module.

9. The safety module as defined in claim 1 or 2, further including at least one spring element for damping vibrations that occur during normal operation of a motor vehicle.

10. A safety module for vehicles, which includes a trigger sensor for activating a safety system in the event of an accident and a protective device to prevent improper triggering, wherein the protective device comprises a damper mass mounted directly on the safety module, wherein the safety module is a belt tensioner device, wherein the safety module further includes a housing, and wherein the damper mass is a metal plate that is affixed to an external surface of the housing.

11. The safety module as defined in claim 10, wherein the belt tensioner device includes a belt reel that projects into a cutout in the metal plate.

12. The safety module as defined in claim 11, further including a pyrotechnic device for activating the safety module.

13. The safety module as defined in claim 11, wherein the belt tensioner device is attached to a column of a motor vehicle body that adjoins a sliding side door.

14. The safety module as defined in claim 10, further including a pyrotechnic device for activating the safety module.

15. The safety module as defined in claim 10, wherein the belt tensioner device is attached to a column of a motor vehicle body that adjoins a sliding side door.

16. A safety module for vehicles, which includes a trigger sensor for activating a safety system in the event of an accident and a protective device to prevent improper triggering, wherein the protective device comprises a damper mass mounted directly on the safety module, further including at least one spring element for damping vibrations that occur during normal operation of a motor vehicle, wherein the spring element is a resilient attachment bracket with which the safety module can be attached to a vehicle.

17. A safety module for vehicles, which includes a trigger sensor for activating a safety system in the event of an accident and a protective device to prevent improper triggering, wherein the protective device comprises a damper mass mounted directly on the safety module, wherein the safety module further includes a housing that encloses the trigger sensor and the damper mass is affixed to the housing, wherein the safety module is a belt tensioner device, and wherein the damper mass is a metal plate that is affixed to an external surface of the housing.

18. The safety module as defined in claim 17, wherein the belt tensioner device includes a belt reel that projects into a cutout in the metal plate.

19. The safety module as defined in claim 18, further including a pyrotechnic device for activating the safety module.

20. The safety module as defined in claim 18, wherein the belt tensioner device is attached to a column of a motor vehicle body that adjoins a sliding side door.

21. The safety module as defined in claim 17, further including a pyrotechnic device for activating the safety module.

22. The safety module as defined in claim 17, wherein the belt tensioner device is attached to a column of a motor vehicle body that adjoins a sliding side door.

23. A safety module for vehicles, which includes a trigger sensor for activating a safety system in the event of an accident and a protective device to prevent improper triggering, wherein the protective device comprises a damper mass mounted directly on the safety module, wherein the safety module further includes a housing that encloses the trigger sensor and the damper mass is affixed to the housing, further including at least one spring element for damping vibrations that occur during normal operation of a motor vehicle, wherein the spring element is a resilient attachment bracket with which the safety module can be attached to a vehicle.

* * * * *